United States Patent [19]

Schwickert et al.

[11] Patent Number: 4,673,421
[45] Date of Patent: Jun. 16, 1987

[54] FLUE GAS INJECTION DEVICE IN A COOLING TOWER

[75] Inventors: Manfred J. Schwickert, Bochum, Fed. Rep. of Germany; Pierre L. Lemmens, Brussels, Belgium

[73] Assignee: Engetra S.A., Fribourg, Switzerland

[21] Appl. No.: 848,301

[22] Filed: Apr. 4, 1986

[30] Foreign Application Priority Data

Apr. 15, 1985 [EP] European Pat. Off. ........ 85870053.7
Oct. 2, 1985 [CA] Canada .................................. 492103

[51] Int. Cl.[4] ............................................. B01D 45/08
[52] U.S. Cl. ................. 55/238; 55/257 PV; 55/440; 55/464
[58] Field of Search ................. 55/186, 224, 237, 238, 55/257 PV, 257 QV, 261, 440, 458, 462, 464

[56] References Cited

U.S. PATENT DOCUMENTS

| | | | |
|---|---|---|---|
| 2,356,192 | 8/1944 | Yingling | 55/257 PV X |
| 2,575,359 | 11/1951 | Ortgies | 55/238 X |
| 2,993,565 | 7/1961 | Coulter | 55/462 X |
| 3,355,864 | 12/1967 | Sobeck | 55/462 X |
| 3,593,500 | 7/1971 | Ritland et al. | 55/418 X |
| 3,646,595 | 2/1972 | Williams | 55/418 X |
| 3,669,425 | 6/1972 | Copeland | 55/237 X |
| 3,713,278 | 1/1973 | Miller et al. | 55/418 X |
| 3,876,396 | 4/1975 | Arnold et al. | 55/257 PV X |
| 4,045,193 | 8/1977 | Halliday | 55/440 X |
| 4,302,227 | 11/1981 | Miller | 55/462 X |
| 4,483,696 | 11/1984 | Zipay et al. | 55/186 |
| 4,514,202 | 4/1985 | Kinney, Jr. et al. | 55/257 PV X |
| 4,539,024 | 9/1985 | Stehning et al. | 55/257 PV X |

FOREIGN PATENT DOCUMENTS

| | | |
|---|---|---|
| 347141 | 1/1922 | Fed. Rep. of Germany . |
| 1601137 | 5/1970 | Fed. Rep. of Germany . |
| 2229762 | 1/1974 | Fed. Rep. of Germany . |
| 2510754 | 4/1977 | Fed. Rep. of Germany . |
| 7821546 | 7/1978 | Fed. Rep. of Germany . |
| 2738501 | 3/1979 | Fed. Rep. of Germany . |
| 2752288 | 5/1979 | Fed. Rep. of Germany . |
| 2453488 | 11/1981 | Fed. Rep. of Germany . |
| 3043234 | 6/1982 | Fed. Rep. of Germany . |
| 3333172 | 4/1984 | Fed. Rep. of Germany . |
| 3327931 | 2/1985 | Fed. Rep. of Germany . |
| 2275744 | 10/1977 | France . |
| 2393600 | 1/1979 | France . |
| 2534150 | 4/1984 | France . |
| 2544997 | 11/1984 | France . |
| 525702 | 9/1940 | United Kingdom . |
| 578985 | 11/1977 | U.S.S.R. ........................ 55/440 |
| 1112169 | 9/1984 | U.S.S.R. ........................ 55/440 |

Primary Examiner—Robert Spitzer
Attorney, Agent, or Firm—Walter H. Schneider

[57] ABSTRACT

A flue gas injection device for use in conjunction with a natural draught cooling tower of a power station comprising a pipe (1) fitted with a slot (3) for injecting desulphurized flue gas to at least one compartment (4) to regulate the flue gas speed. Compartment (4) is in communication through at least one drop separator (5) with the inside of the cooling tower (2) above the latter's exchange body.

20 Claims, 11 Drawing Figures

FLUE GAS INJECTION DEVICE IN A COOLING TOWER

BACKGROUND OF THE INVENTION

1. Field of the Invention

The field of application of the invention consists of natural draught counter-flow cooling towers of sulphurous fossil fuel-fired power stations provided with flue gas desulphurization installation.

The invention concerns the desulphurized flue gas injection device of these power stations in these cooling towers.

For ecological reasons, basically to stop the damage to forests and the acidification of lakes, and to save their fauna and flora, power stations burning suphurous fuels are forced to take measures so that the flue gas discharged to the atmosphere is low in sulphur content. The measures considered consist in desulphurizing the flue gas at the air preheater outlet.

2. Description of the Prior Art

The current desuphurization processes consist in scrubbing the flue gas with chemical solutions. Patent FR No. 2 534 150 describes such a process. The desulphurized gas is at a relatively low temperature, of the order of 80° C., and is saturated with humidity. This desulphurized gas is too cold to be sent in the normal stacks of power stations and its ascensional force is also reduced by this low temperature, which prevents the fine dispersion of the flue gas in the atmosphere. Consequently, it is desirable to send the flue gas out the natural draught cooling towers to benefit from the powerful ascensional force of the warm air dischrged from these cooling towers, due basically to their large air flow, in spite of the temperature of this air (for example 30° C.) being lower than that of the desulphurized flue gas.

The idea of discharging the flue gas by means of natural draught cooling towers is old as shown in DE No. 347 141. Other references are GB No. 525 702, DE No. 1 601 137, DE No. 2 228 762, DE No. 2 453 488, and, more recently, DE No. 27 38 501 and DE No. 27 52 288 in which the flue gas is desulphurized.

The injection of flue gas in natural draught cooling towers raises some problems, because the flue gas desulphurization is not complete. The initial sulphur content is, for example, of the order of 100 g/m$^3$, which is lowered to a value of the order of one gram per cubic meter.

The same applies to the other toxic compounds of the flue gas, particularly nitrogen oxides (NO$_x$). It is desirable to considerably dilute this flue gas in the cooling tower warm air, which has a flow about 10 times higher, to avoid relatively high local concentrations of toxic products at the cooling tower outlet, and to carry the flue gas with the large warm air flow of the cooling tower as a single, nearhomogeneous mass of air. The thorough mixing of the flue gas with the cooling tower air flow will have the effect of increasing the cooling tower draught because of the temperature rise of the mass of mixed air. This matter of mixing appears to have escaped the inventors of the various above-cited patents, in particular of DE No. 2 228 762. Actually the draught increase is desirable not only to reduce the cooling tower dimensions for the same cooling capacity, but also to offset the additional head losses of the cooling tower air flow due to the flue gas pipes of the flue gas injection devices.

Actually, these pipes are very large, for example, for a cooling tower with a diameter of 100 m at the level of the exchange body, above which the flue gas would be injected, the flue gas would be injected by two 7 m diameter pipes.

A characteristic of the desulphurized flue gas is its saturation with water vapour from the wet desulphurization process. The result of this is that any temperaure drop of this flue gas causes the condensation of water vapour in the form of micro-droplets, with a diameter of the order of one micron. Such a cooling of this gas occurs in the pipe which convey it to the inside of the cooling tower. For the cited example (100 m diameter cooling tower, serving a turbo-generator set of 600 MWe), the condensed water flow is of the order of 1 tonne per hour. These water droplets pick up, in part, the sulphur oxides of the flue gas and will therefore be acidified, with their pH being capable of dropping down to 2, for example.

The fine water droplets, of a few microns diameter, are carried far away by the cooling tower air flow and are thus well dispersed in the atmosphere. As against this, the larger water drops, resulting from the coalescence of the fine droplets, or from the separation of the drops from water films formed on colder surfaces, in particular the pipe walls, must be gathered up so that they are not discharged in the atmosphere by the cooling tower and subsequently precipitated close to it, causing damage by their acidity. The means installed to provided the flue gas mixing will therefore have to avoid the presentation of contact surfaces which would be contacted on one side by the relatively hot flue gas (45° to 90° C.) and, on the other side, by the relatively cold (for example 30° C.) cooling tower air flow. Actually, a film of acid water would be formed on the side contacted by the flue gas with separation of water drops of relatively larger diameters, e.g. 0.1 mm-1 mm, and even larger. Mixers as described in patents DE No. 33 27 931, DE No. 30 43 329 or FR No. 2 275 744 are therefore not suitable.

SUMMARY OF THE INVENTION

The objective of the present invention is a flue gas injection device for cooling towers which:

provides a thorough mixing of flue gas in the cooling tower air flow, picks up flue gas water droplets of a diameter exceeding the critical diameter above which, if they were dispersed into the atmosphere, would not be dispersed far enough to be absorbed by evaporation or by mingling with the clouds;

collects these water droplets and conveys them either outside the cooling tower, where they can, for example, be neutralized and then discharged to the sewers or into the basin of the cooling tower where they dissolve within a large volume of circulating water;

does not present, after the drop separators, condensation sufaces for the flue gas;

only presents small head losses for the cooling tower air flow (less than 10% of the exchange body head losses) and only lightly disturbs the air distribution in the cooling tower exchange body;

presents acceptable head losses for the flue gas flow (compared to the relatively high head losses of this gas flow across desulphurization installations).

These objectives are attained by a flue gas injection device as defined herein and in the claims.

DESCRIPTION OF THE DRAWINGS

The invention is now described referring to the attached drawings in which.

DESCRIPTION OF THE PREFERRED EMBODIMENTS

In these various figures, the same reference notations designate the same elements.

The device in accordance with the invention consists of at least one horizontal pipe 1 delivering the flue gas in cooling tower 2 above the exchange body with its distribution and drop separators, i.e. at the lowest stack level which is completely clear. Pipe 1 represents at its upper level a relatively narrow slot 3, which extends from a clearance distance after pipe 1 crosses shell 12 of the cooling tower 2 up to the end thereof, pipe 1 stopping at a similar clearance from the opposite side of the cooling tower shell.

Slot 3 extends only along pipe 1 where it is surmounted by a succession of compartments 4 which have approximately the width of pipe 1, or are slightly narrower, and which are closed by a top wall or roof 7 and lower wall 8, with side faces consisting of drop separator panels 5 distributing the flue gas approximately perpendicular to these side faces. Examples of appropriate drop separators, known in themselves, are found described, for example, in FR No. 2 393 600, DT No. 2 510 754 B2, GM No. 7 821 546, DE No. 3 333 172 A1, FR No. 2 544 997.

A drop separator panel as described in said publications comprises a plurality of transversely extending deflector elements consisting of plates mounted in a frame. These deflector elements define zigzag or sinuous channels connecting the interior of compartments 4 with the exterior of said compartments (i.e. the enclosure of the cooling tower). Said deflector elements are vertical or substantially so for the purpose of easily collecting at the panel base, in a channel, (designated here 10 in FIG. 6) the water picked up by phase separator chambers of said deflector elements. Said phase separator chambers are mounted in the areas of the wave crests of said sinuous deflector elements and are provided with inlet slots opening towards the flue gas flow.

The lenght of each compartment 4 is of the order of magnitude of the diameter of of the width of pipe 1. For example, it is 4 m for a pipe diameter of 5 to 7 m. Vertical partitions 6 close these compartments perpendicularly to the pipe length, their purpose being to reduce to zero the flue gas velocity component along the pipe length. So as to reduce the obstruction offered by horizontal pipe 1 to the cooling tower vertical air flow, the pipe 1 can be reduced in cross section along its length inasmuch as the flue gas speed can be increased. The flue gas speed crossing the shell 12, is for example, 15 to 25 m/sec, while the cooling air ascensional speed, is of the order of 1.5 to 3 m/sec., at the level of pipe 1.

So as to provide a thorough mixing of the flue gas, the gas flow must also be as equal as possible along slot 3 of the pipe, and this is why preferably the slot has a constant width.

As for the pipe 1, it can be circular with a decreasing diameter which maintains an approximately constant speed in it, but this scheme is costly and is not ideal from the head losses standpoint. The pipe can be circular with a single constant diameter. The pressure variation inside such a pipe is slight over the length of the pipe, which is favourable for the flow uniformity along the slot. Slot 3 is relatively narrow so that the internal pressure variation of the pipe over the length of the pipe, i.e., the flue gas had losses in the pipe, is very small when compared to the flue gas head losses at the slot crossing.

The slot width is such, for example, that its total passage section (width×length, for example, 0.8 m×(24 m+24 m)) is approximately equal to the cross section (for example 38 m$^2$) of the pipe at the cooling tower shell crossing.

So as to reduce the pipe cost, the latter can be formed of either two (as shown), or of a smaller number of sections each of decreasing cross-section starting from the shell crossing.

The pipe can also be of oval or rectangular cross section, or any cross section whatsoever.

In accordance with the pipe construction technology, slots 3 may be strutted, i.e., provided with struts or ties to keep its width constant located, for example, between each compartment. These struts or ties can, if necessary, be closer, for example, at 1 m spacing.

Compartment roof 7 is flat, or dished as shown in the drawings.

Figure 1:
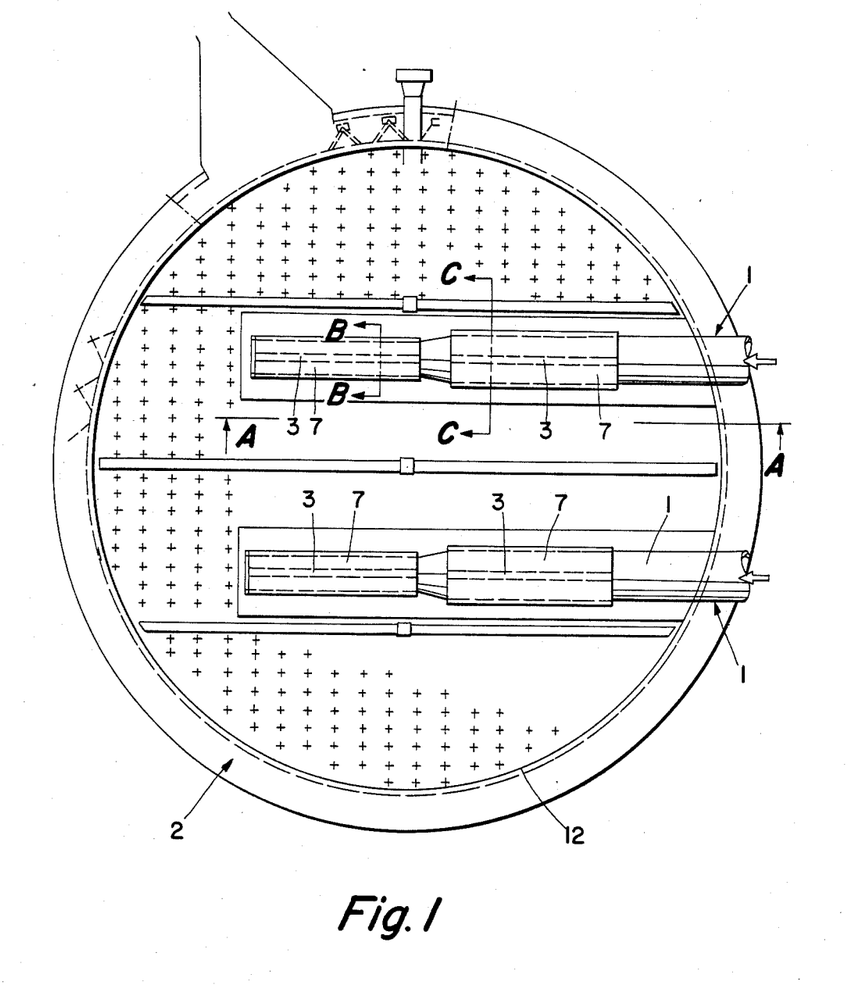
FIG. 1 is a horizontal section view of a natural draught cooling tower showing the layout of two desulphurized flue gas delivery pipes in the cooling tower.
Figure 2:
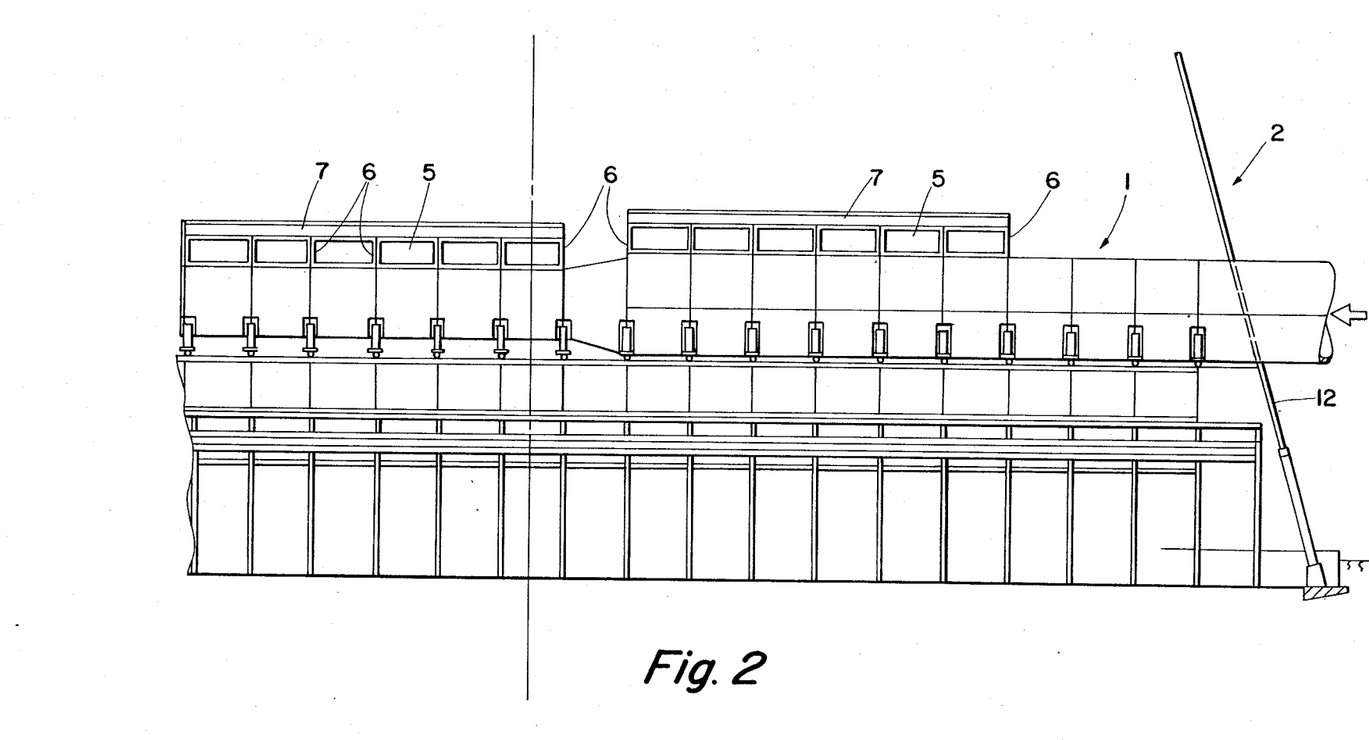
FIG. 2 is a vertical longitudinal section view of one of the pipes on the line A—A of FIG. 1.
Figure 3A:
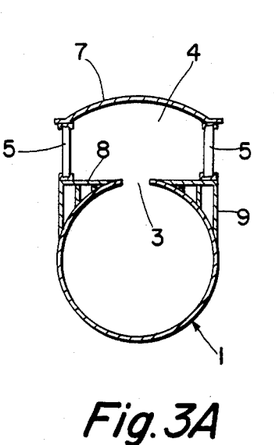
FIGS. 3A and 3B are cross-section views following line B—B and line C—C, respectively, of FIG. 1.
Figure 3B:
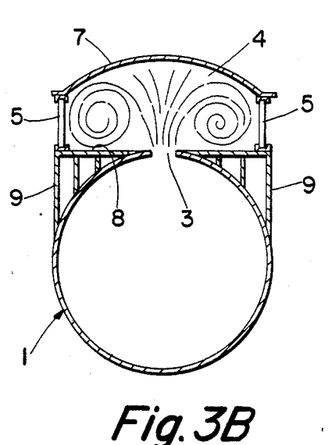
Figure 4:
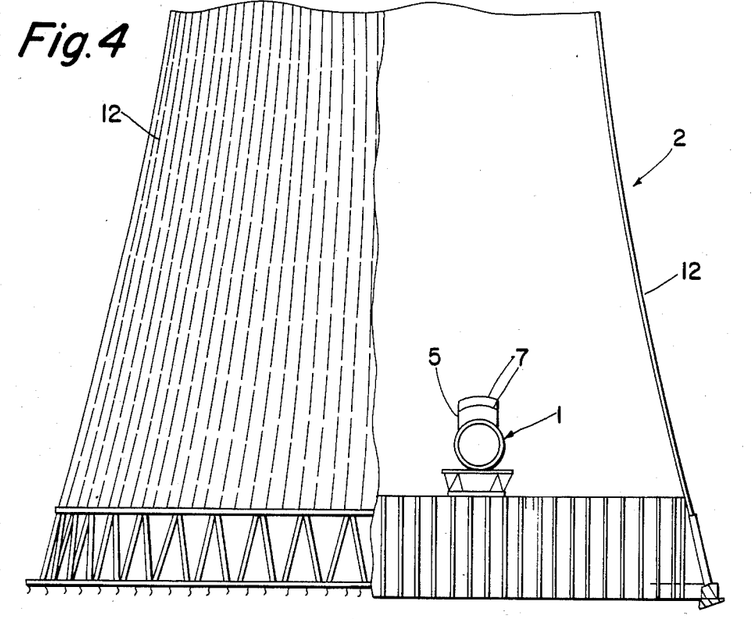
FIG. 4 is a part-elevation and -section view of the low part of the cooling tower showing the layout of a flue gas delivery pipe and its support device.

The flue gas crosses slot 3 at a speed of the same order of magnitude as that at the shell crossing, for example, 15 to 25 m/sec., with an oblique velocity component, pointing upwards and to the pipe end (FIG. 2). The jets of the flue gas of the compartments burst on their roofs and on the partitions located downstream of each compartment and are divided in two gaseous flows going respectively towards each of the two side faces of the compartments (FIG. 3B).

The height of side faces of drop separator panel 5 is determined by maximum permissible speed for the flue gas which does not separate water droplets. This speed is a function of the type of drop separator used, and is, for example, 5 m/sec. Taking into account the unevenness of the speed, the mean speed is, for example, 4.5 m/sec., the flue gas crossing the drop separator panels at speeds from 4 to 5 m/sec. It follows that the total cross-section of these panels is about 4 times greater than the pipe cross-section at the cooling tower shell crossing.

Height of panels 5 consequently is, in practice, generally between one half and one quarter of the diameter of pipe 1.

Compartments 4 thus present, in accordance with their proportions, two stilling chambers, one on either side of slot 3, thus ensuring a fairly constant flue gas speed through the drop separators 5.

When there is only one pipe delivering the flue gas to the cooling tower, this pipe is preferably located diametrically in tower 2. But, preferably, there are two parallel pipes positioned symmetrically in the tower, giving a better flue gas distribution in the tower.

There can also be more than two flue gas pipes, but major space problems soon occur when the number of pipes is over 2.

The pipes can also not be parallel to one another but, for example, be positioned radially.

Pipe and compartment materials can be of various kinds, for example, painted steel, asbestos cement, glass fibre-reinforced plastics, polyvinyl chloride.

As the flue gas speed at drop separator outlets 5, of 4 to 5 m/sec. horizontally, is markedly higher than the hot air ascension speed of the heat exchange body, of 1.5 to 3 m/sec., the flue gas diffusion, particularly when there are two pipes delivering the flue gas to the cooling tower, is thoroughly obtained in the whole air flow of the cooling tower, yielding a good mixing.

Figure 5:
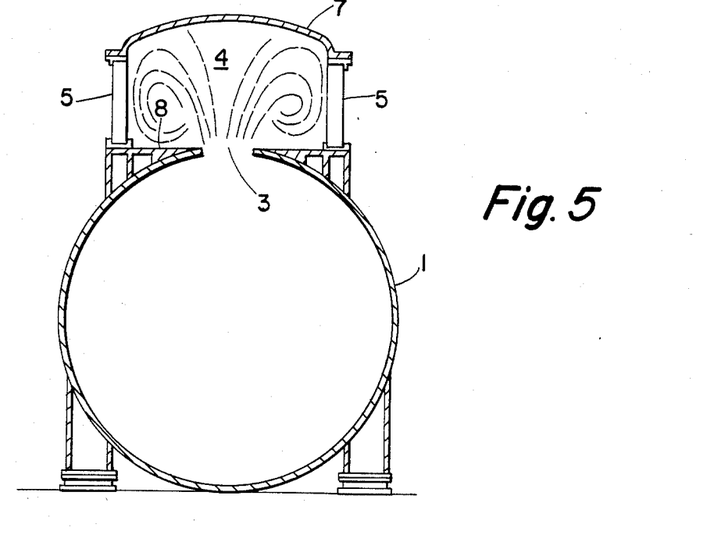
FIG. 5 is a variant of FIG. 3B.

As a variant, when the flue gas pipe(s) are formed by at least two sections of decreasing diameters, the compartments 4 can all have the same width, in particular equal to the one of the smallest pipe diameter. This is represented in FIG. 5 where pipe 1 is the one of FIG. 3B, whilst compartment 4 is identical to the one which surmounts the pipe with the smallest diameter, i.e. the compartment shown in FIG. 3A.

As a further variant, lower wall 8 can be formed by the part of pipe 1 located under compartments 4, the side faces 9 located in the water drop separator 5 extension being sealed walls.

In the case where the lower wall 8 of compartments 4 are formed of floors separate from the wall of pipe 1 these floors can be either horizontal or preferably slightly sloping to the outside to allow the water, which is condensed at the low part of the separator panels 5, to discharge.

All compartments 4 of the same pipe section can be continuous, the separator panels 5 only being separated by support elements, and two adjoining compartments being only separated by a single partition 6. But all compartments 4 of the same pipe section can also be discontinuous, each compartment 4 having its own partitions 6 upstream to break the horizontal component of the flue gas parallel to the pipe, and downstream to provide its sealing, as the flue gas can only leave the pipe through the drop separators.

Partitions 6 of compartments 4 can, if appropriate, be provided with openings allowing personnel movements, for example for inspection purposes, when there is no flue gas injection; these openings can be provided with doors, which may be sliding, for example. If these openings are not provided with doors, they are contiguous to the side faces 5 so as to be substantially outside the projection of slot 3 on partition 6 so that the latter should fully maintain its role with respect to the horizontal velocity component of the gas crossing slot 3. In the case of a discontinuous set of compartments, the openings of the two adjoining partitions are connected by a sealed tunnel.

Figure 6:
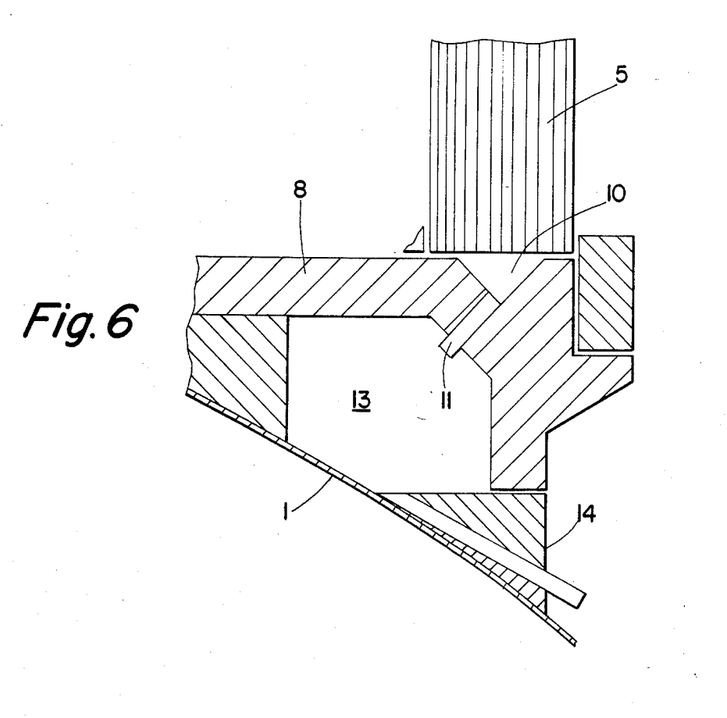
FIG. 6 is a detail of the junction of a drop separator panel with the floor of a compartment surmounting a pipe gas.

As shown in FIG. 6, the droplets retained by the drop separator panels fall in channel 10, whence they go through a drain 11 in space 13 between floor 8 and pipe 1 to finally come out by a pipe 14 and be thus discharged.

Figure 7:
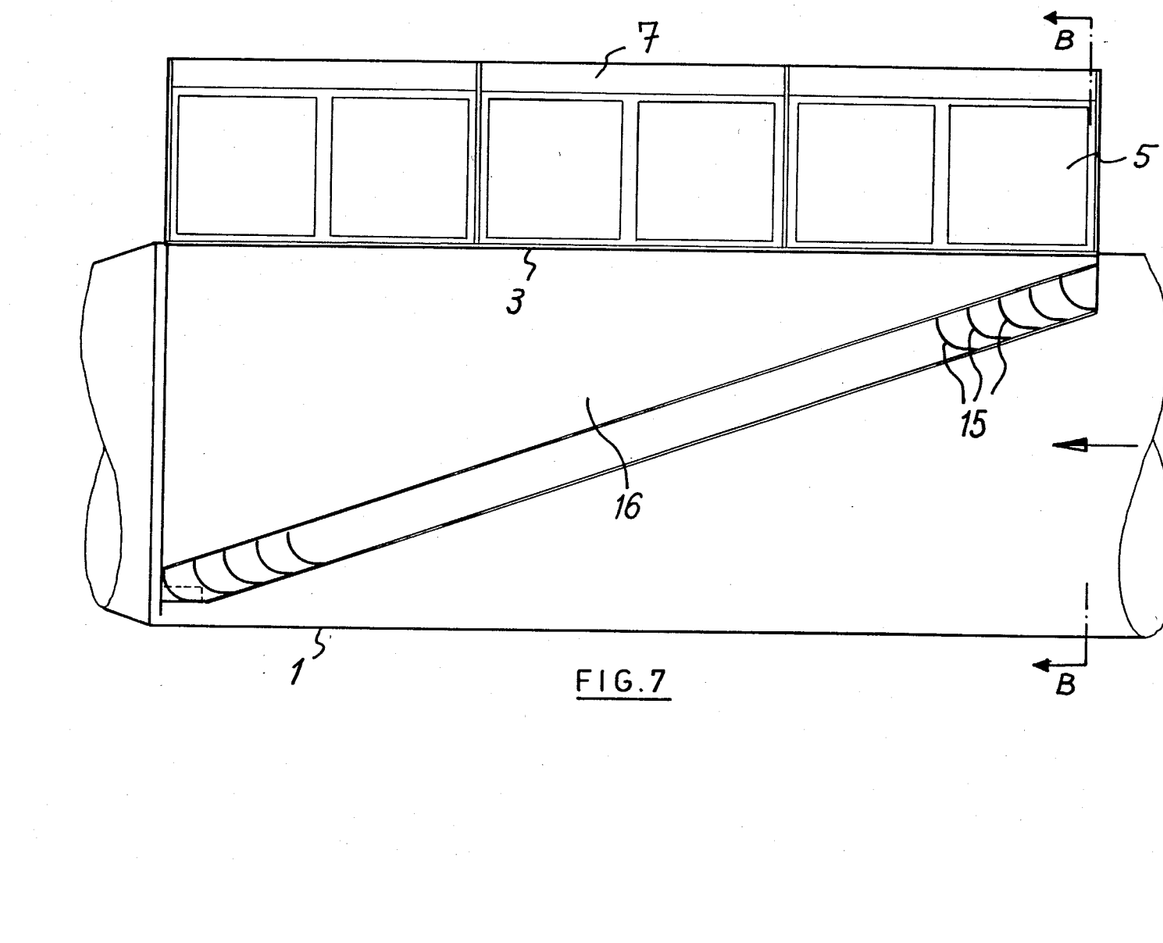
FIG. 7 is a vertical longitudinal section view of a pipe variant following line A—A of FIG. 8.
Figure 8:
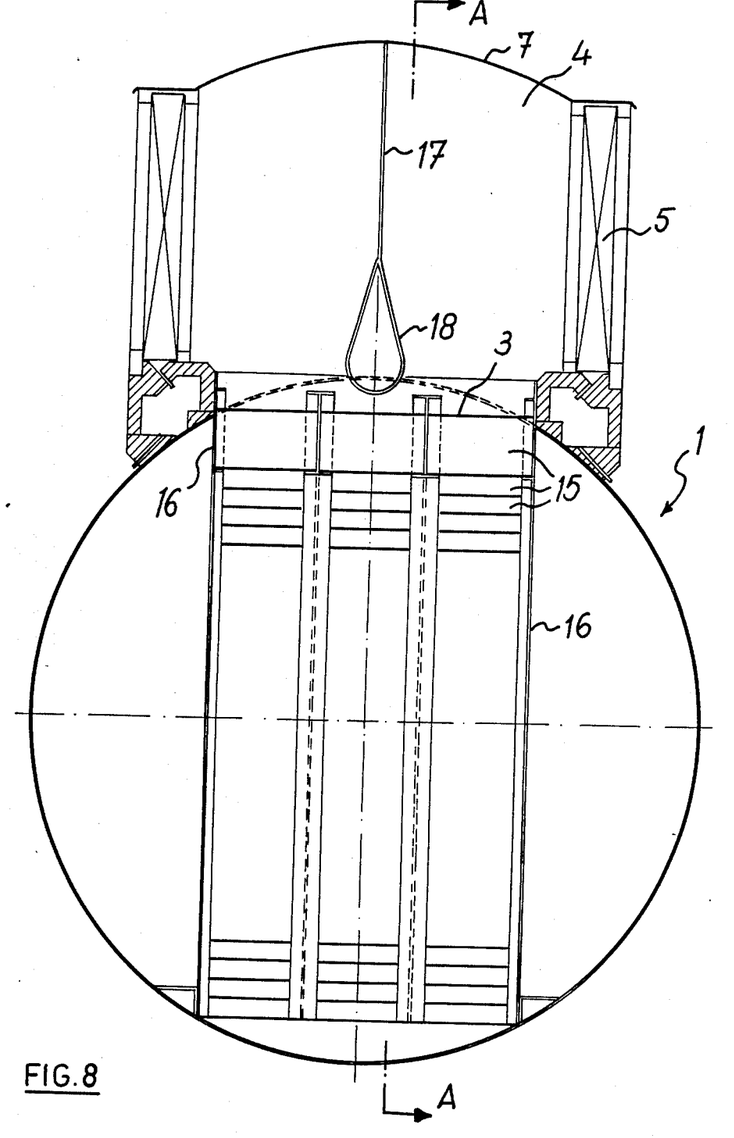
FIG. 8 is a cross-section view to a larger scale following line B—B of FIG. 7.

In a variant shown in FIGS. 7 and 8, the slot has a large width. The low head losses of the flue gas crossing it do not allow the provision of adequate uniformity of the flue gas distribution along the slot. This flue gas distribution uniformity is therefore provided by deflectors 15 located inside pipes 1, under slots 3. Deflector width is preferably constant and approximately equal to that of the slot. An uninterrupted set of deflectors is positioned under slots 3, in a descending alignment from the start of the slot, as shown in the drawing, to close to the bottom of pipes 1. So as to ensure a gas distribution as even as possible along the various sections of pipe 1, deflectors 15 can be mounted so that they can be rotated individually. Direction of each deflector 15 will be finally fixed when put into service.

Preferably, the deflector assembly is provided with side partitions 16, except possibly for the last section. The side sections 16 extend on their upper side to the pipe slot 3 and on their lower side, either approximately to the level of each deflector, these side partitions then being triangular, or to the level of the lowest deflector, these side partitions then being rectangular.

When pipes 1 consist of two or more sections of decreasing diameter and without a slot provided in the tapered connections linking the sections, the deflector alignment restarts from the upper level of each pipe section. In the last section, the deflector alignment ends at the bottom of the pipe. For the other sections, it stops either at the bottom of the pipe, or at an intermediate level.

When there are several sections, the flue gas flow to each subsequent section passes from the preceding section through the spaces located between the side walls and the pipe walls, as well as in the lower part of the pipe located under the last deflector.

The flue gas injection device in accordance with this variant of FIGS. 7 and 8 is more costly than the previously described device, basically because of the deflectors. It is justified, however, in the improvement of the uniformity of the air distribution over the height of the drop separator panels 5 when the head losses of these panels when crossed by the flue gas are low compared to the dynamic energy which the flue gas has when crossing the narrow slots 3. In such cases (e.g., FIG. 3, with relatively low head losses at panels 5), the flue gas mainly comes out on the upper part of panels 5 where their excessively high speeds can lead to the extraction of droplets, whilst too low speeds at the bottom of the panels can lead to the passing of droplets because of the reduction of the inertia effect of these droplets.

It is technically possible to make this speed uniform by devices located inside chambers 4, but it would be very high in investment costs and in head losses. The problem of distribution of the flue gas over the height of panels 5 is effectively solved by the above-described deflector variant of FIGS. 7 and 8. The deflector variant advantageously comprises an injection device where the compartments 4 are provided with median vertical partitions 17 to stabilize the flow. Base 18 of these vertical partitions may be enlarged and shaped, e.g., as shown in FIG. 8. Without vertical partition 17, the jet of the gas flow striking the middle of the roof of compartments 4 would give rise to instabilities by changing periodically from one side 5 to the other.

Concerning side faces 5 of compartments 4, drop separator panels can occupy only part of height of these side faces 5, the lower and/or upper parts of these faces being closed. The objective of such a layout is to avoid excessively low- or high-air speed zones through the drop separators, zones which are liable to exist at the lower and upper ends of the panels. By limiting the drop separator panel height to a part of the side face height, a smaller air speed variation over the height of these panels is obtained.

It is clear that if one does not wish to increase the mean air speed through these panels in this variant, the height of these side faces 5, and therefore of compartments 4, has to be increased, to allow the placing in it of a lower and/or upper closed zone (without separators). For a diameter of pipes 1 of 7 m, side face height is, for example 3.5 m, that of drop separators 2.0 m, that of lower closed zone 0.5 m and that of upper closed zone 1.0 m.

Figure 9:
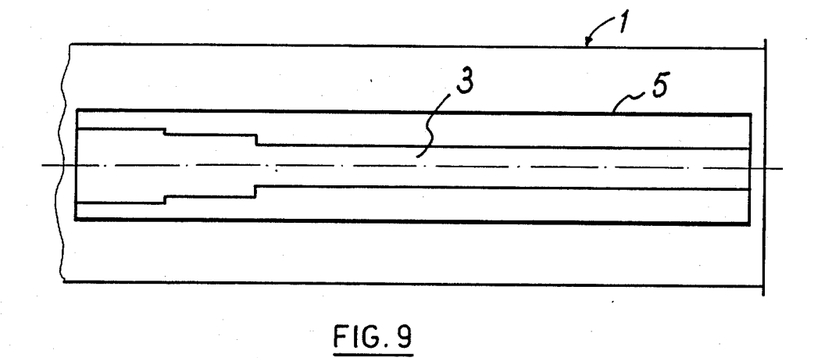
FIG. 9 is a partial plan view of part of pipe at level of its upper part.

As shown in FIG. 9, slot 3 can be of variable width, i.e., the width increasing uniformly (trapezoidal slot), or by steps (constant width slot), from the start of pipe 1 to its end. For example, the width may be 1 m at its entrance end where the gas arrives, and 3 m at the opposite end. The objective of the adoption of a variable width slot is to compensate for the static and dynamic pressure variations inside pipes 1 over their length.

In the embodiment comprising several pipe sections in which the deflector assembly 15 does stop at an intermediate level before the bottom of the pipe and in which side partitions 16 are of rectangular shape, a lower partition 19 connecting side partitions 16 can be provided (see FIG. 10) so that the flue gas passes under lower partition 19 of one section to the following section.

Figure 10:
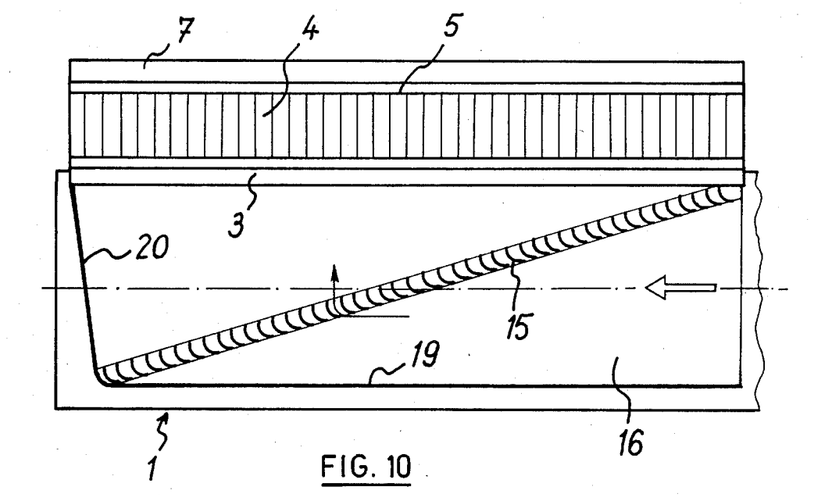
FIG. 10 is a section view similar to FIG. 7 showing an execution variant.

As shown in FIG. 10, sections of pipe 1, which precede the final section, can also be provided with an end partition 20 connecting the lower deflector 15 to slot 3 near compartment 4. In this case and when side partitions 16 are of rectangular shape and lower partitions 19 have been provided, one obtains a delivery box of compartments 4.

The invention is not limited to the details set out in this specification.

We claim:

1. A device for injecting desulphurized flue gas into a cooling tower for discharge to the atmosphere with the hot air discharged from said tower which comprises: at least one flue gas injection pipe for insertion through the shell of said cooling tower; a slot in the upper part of said pipe extending along at least a part of its length and providing communication between said pipe and a slot enclosing compartment, said slot serving to regulate the speed of said flue gas through said pipe and into said compartment; and a drop separator on at least one side of said slot in communication with said compartment, said drop separator defining a panel through which said flue gas is injected into the hot air of said cooling tower at a point above the exchange body of said cooling tower, said at least one separator panel forming at least one side wall of said compartment.

2. A device according to claim 1 in which said compartment is sectioned off along its length by successive partitions, there being provided a plurality of drop separator panels which form the side walls of the compartment sections.

3. A device according to claim 1 in which the height of said side walls is one-fourth to one-half the width or diameter of said pipe.

4. A device according to claim 1 in which the width of said slot is such that its total passage section is approximately equal to the pipe cross-section at that place where the pipe crosses the shell.

5. A device according to claim 1 in which said pipe is of decreasing cross section, said pipe comprising at least two sections of different cross sections each provided with a separate slot communicating with a separate compartment.

6. A device according to claim 5 in which the width of the compartment of the section of larger cross section is the same as that of the compartment of the section of smaller cross section.

7. A device according to claim 5 in which each section has an assembly of deflectors extending in descending alignment from one end to the other in the direction of flue gas flow.

8. A device according to claim 7 in which the descending alignment of the assembly of deflectors in the last section reaches the bottom of the pipe while that in preceding sections reaches only to intermediate levels.

9. A device according to claim 1 in which each drop separator communicates with a drain beneath it for collecting condensate and conveying it from said device.

10. A device according to claim 1 in which said pipe is provided in its interior with deflectors beneath said slot, the width of said deflectors being equivalent to that of the slot.

11. A device according to claim 10 in which the deflectors are in the form of an assembly extending the length of said slot, said deflectors extending in descending alignment from one end of said slot to the other in the direction of flue gas flow.

12. A device according to claim 11 in which the deflectors are provided with side partitions.

13. A device according to claim 12 in which a horizontal partition extends between the bases of the side partitions.

14. A device according to claim 13 in which a vertical partition extends from the lowest deflector to the pipe near the end of said slot.

15. A device according to claim 1 in which said compartment is provided with a median vertical partition.

16. A device according to claim 15 in which said median vertical partition has an enlarged base.

17. A device according to claim 1 in which said slot is of variable width.

18. A device according to claim 1 in which the device comprises two pipes.

19. A device according to claim 18 in combination with a cooling tower in which the two pipes of said device are positioned parallel to each other and symmetrically within said cooling tower.

20. A device according to claim 1 in combination with a cooling tower in which said device is positioned radially within said cooling tower.

* * * * *